United States Patent
Kalina et al.

(10) Patent No.: US 7,862,114 B2
(45) Date of Patent: Jan. 4, 2011

(54) SEAT RESTRAINING DEVICE

(75) Inventors: Curtis David Kalina, South Lyon, MI (US); Richard Edward Ruthinowski, Taylor, MI (US); Manoharprasad K. Rao, Novi, MI (US); Brian Robert Spahn, Plymouth, MI (US); Joseph Robert Brown, Grosse Ile, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 42 days.

(21) Appl. No.: 11/937,711

(22) Filed: Nov. 9, 2007

(65) Prior Publication Data

US 2009/0121533 A1    May 14, 2009

(51) Int. Cl.
*B60N 2/42* (2006.01)
*B60R 21/00* (2006.01)

(52) U.S. Cl. ............... 297/216.2; 297/16.1; 297/216.1; 297/216.16

(58) Field of Classification Search ............... 297/16.1, 297/19, 216.1, 216.16, 216.2, 216.13
See application file for complete search history.

(56) References Cited

U.S. PATENT DOCUMENTS

| | | | | |
|---|---|---|---|---|
| 2,823,730 | A * | 2/1958 | Lawrence | ............... 297/216.2 |
| 4,846,526 | A | 7/1989 | Allen | |
| 4,869,541 | A | 9/1989 | Wainwright | |
| 5,292,178 | A | 3/1994 | Loose et al. | |
| 5,390,982 | A | 2/1995 | Johnson et al. | |
| 5,397,167 | A | 3/1995 | Fourrey et al. | |
| 6,045,186 | A | 4/2000 | Butt et al. | |
| 6,334,643 | B1 * | 1/2002 | Lindblad et al. | ......... 296/65.09 |
| 6,520,581 | B1 | 2/2003 | Tame | |
| 6,533,351 | B2 * | 3/2003 | Deptolla | ................. 297/216.2 |
| 6,685,272 | B1 | 2/2004 | Bonk et al. | |
| 6,695,379 | B1 | 2/2004 | Ishida | |
| 6,857,703 | B2 | 2/2005 | Bonk | |
| 6,902,234 | B2 * | 6/2005 | Becker et al. | ............. 297/216.1 |

(Continued)

FOREIGN PATENT DOCUMENTS

DE    19927463 A1    12/2000

(Continued)

OTHER PUBLICATIONS

European Search Report for corresponding Application No. 08167530.8, mailed May 25, 2009, 6 pages.

*Primary Examiner*—David Dunn
*Assistant Examiner*—Philip Gabler
(74) *Attorney, Agent, or Firm*—Frank A. MacKenzie; Brooks Kushman P.C.

(57) ABSTRACT

The embodiments described herein provide a vehicle seat assembly that is coupled to a floor of a vehicle. The assembly comprises a seat back frame, a seat cushion frame, at least one leg and at least one blocking member. The seat cushion frame is pivotally coupled to the seat back frame. The leg is pivotally coupled to the seat cushion frame and pivotally coupled to the floor of the vehicle. The blocking member is coupled to the seat cushion frame and capable of moving into engagement with the leg as the assembly moves from the folded position to the upright seating position. The blocking member is adapted to block movement of the leg and to stabilize the seat assembly in the event of a vehicle collision.

20 Claims, 7 Drawing Sheets

U.S. PATENT DOCUMENTS

| | | |
|---|---|---|
| 6,902,237 B2 * | 6/2005 | Petry ..................... 297/344.15 |
| 7,036,878 B2 | 5/2006 | Masutani |
| 7,044,543 B2 * | 5/2006 | Schumann et al. ....... 297/216.1 |
| 7,077,471 B2 * | 7/2006 | Schumann et al. ....... 297/216.1 |
| 7,237,839 B2 * | 7/2007 | Aufrere et al. ......... 297/216.13 |
| 7,243,992 B2 * | 7/2007 | Canteleux et al. ........ 297/216.1 |
| 2005/0035647 A1 | 2/2005 | Matsunuma |
| 2005/0046267 A1 | 3/2005 | Becker et al. |
| 2005/0140132 A1 | 6/2005 | Lutz et al. |
| 2006/0066144 A1 | 3/2006 | Tsujibayashi et al. |
| 2006/0091705 A1 | 5/2006 | White et al. |
| 2007/0138847 A1 * | 6/2007 | Gundall et al. ........... 297/216.1 |
| 2007/0284922 A1 * | 12/2007 | Matsuhashi .............. 297/216.2 |

FOREIGN PATENT DOCUMENTS

| | | |
|---|---|---|
| EP | 0572811 A1 | 12/1993 |
| EP | 1780073 A2 | 5/2007 |
| WO | 98/09837 | 3/1998 |
| WO | 98/25790 | 6/1998 |
| WO | 2007082759 A1 | 7/2007 |

* cited by examiner

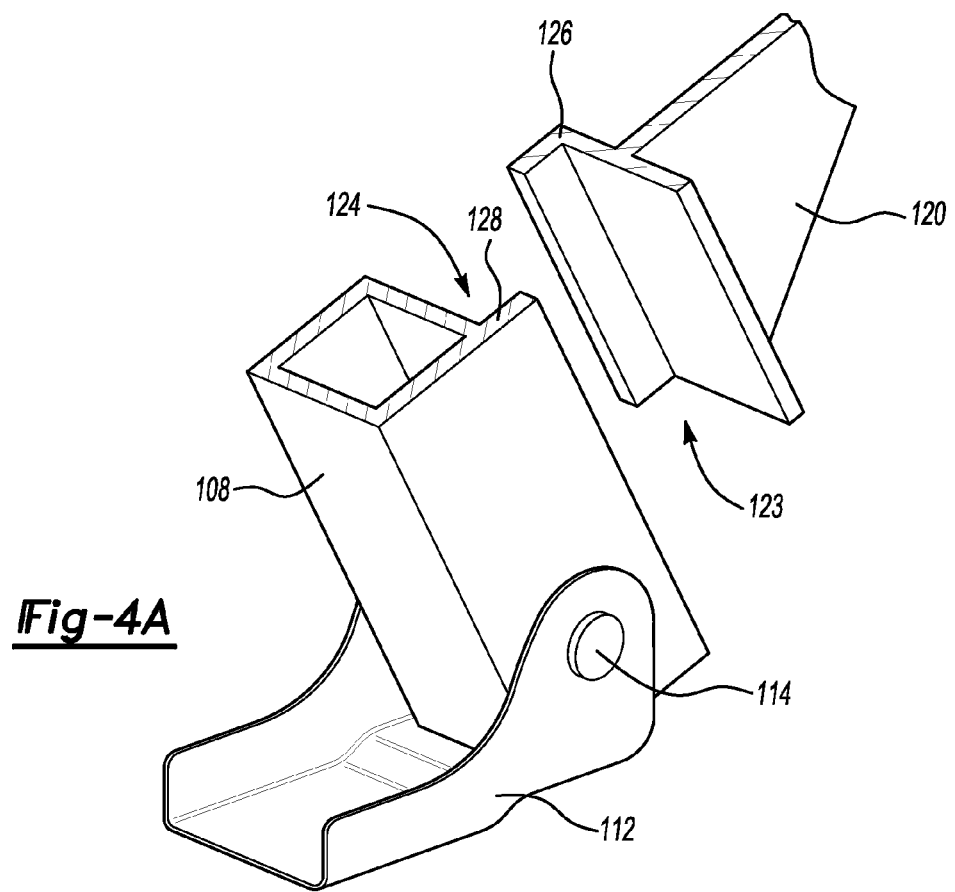
*Fig-4A*
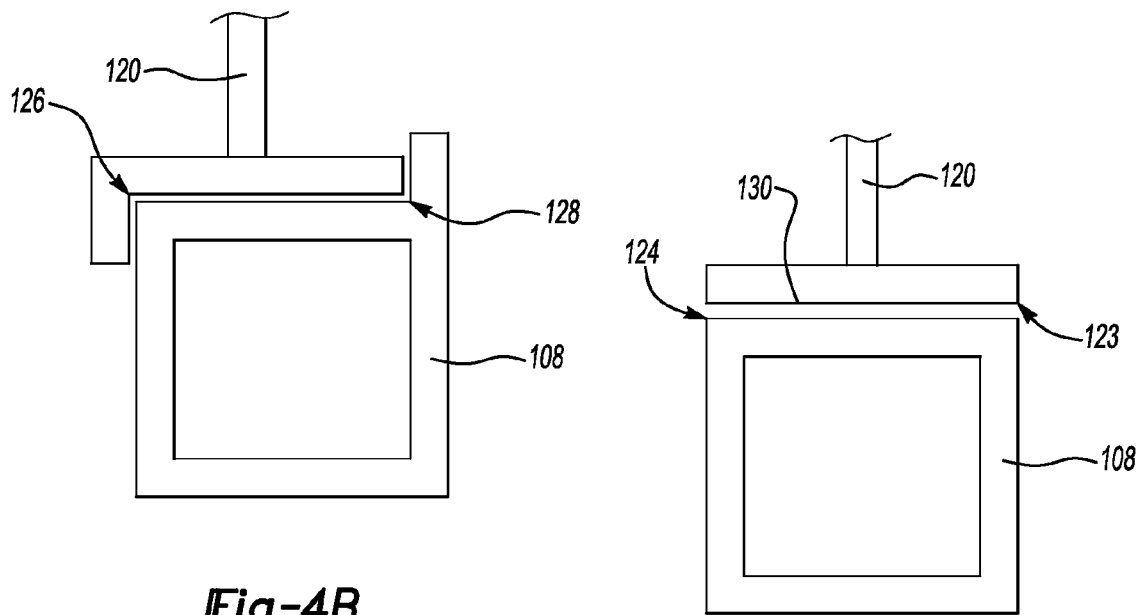
*Fig-4B*
*Fig-4C*

SEAT RESTRAINING DEVICE

BACKGROUND

1. Technical Field

The embodiments of the present invention described herein generally relate to a vehicle seat restraining device.

2. Background Art

A vehicle seat generally includes a seat back, a lower seat cushion and one or more legs. The seat back is supported by a seat back frame and the lower seat cushion is supported by a seat cushion frame. Many seat backs are adapted to pivot about an axis in a direction toward the lower seat cushion when an occupant activates a seat fold down feature. In some cases, the lower seat cushion may be pivotally coupled to the legs. The lower seat cushion may also be pivotally coupled to the seat back. The lower seat cushion may pivot and move forward in a generally downward direction when the occupant activates the seat fold down feature. The lower seat cushion is moved in a direction toward the floor of the vehicle as the seat back rotates forward over the seat cushion. The seat cushion frame is coupled to the vehicle floor via the legs (or stanchions).

During a generally frontal vehicle collision, the seat back may pivot and move forward in an angular motion toward the lower seat cushion. Forces acting on the seat during a vehicle collision may cause the seat back frame, the seat cushion frame, and the legs to pivot and rotate in a generally forward and downward direction causing the seat to fold upon itself and toward the floor of the vehicle. Accordingly, it would be desirable to add a restraining device to the seat to stabilize the seat assembly during a vehicle collision, thereby enhancing occupant safety by reducing the motion of an occupant coupled with the seat.

SUMMARY

In one embodiment, a vehicle seat assembly that is coupled to a floor of a vehicle is provided. The assembly comprises a seat back frame, a seat cushion frame, at least one leg and at least one blocking member. The seat cushion frame is pivotally coupled to the seat back frame. The leg is pivotally coupled to the seat cushion frame and pivotally coupled to the floor of the vehicle. The blocking member is coupled to the seat cushion frame and capable of moving into engagement with the leg as the assembly moves from the folded position to the upright seating position. The blocking member is adapted to block movement of the leg and to stabilize the seat assembly in the event of a vehicle collision.

In another embodiment, a vehicle seat assembly that is coupled to a floor of a vehicle is provided. The assembly comprises a seat back frame, a seat cushion frame, at least one leg and at least one blocking member. The seat cushion frame is coupled to the seat back frame. The leg is coupled to the seat cushion frame and to the floor of the vehicle. The blocking member is coupled to the seat cushion frame and is capable of moving into engagement with the leg in response to the vehicle experiencing an impact. The blocking member is adapted to block movement of the leg and to stabilize the seat assembly in the event of vehicle impact.

In another embodiment, a vehicle seat assembly is coupled to a floor of a vehicle and is adapted to move from a folded position to an upright seating position. The assembly comprises a seat back frame, a seat cushion frame, at least one leg and at least one blocking member. The seat cushion frame is pivotally coupled to the seat back frame. The leg is pivotally coupled to the seat cushion frame and is further coupled to the floor of the vehicle. The blocking member is coupled to a first side of the seat cushion frame. The first side of the seat cushion frame faces the floor of the vehicle. The blocking member is capable of moving into engagement with the leg as the assembly moves from the folded position to the upright seating position. The blocking member is adapted to block movement of the leg and to stabilize the seat assembly in the event of a vehicle collision. The blocking member is disengaged from the leg while the seat assembly is in the folded position.

BRIEF DESCRIPTION OF THE DRAWINGS

FIGS. 4A-4C illustrate first and second engagement surfaces of a leg and a blocking member of the vehicle seat assembly;

DETAILED DESCRIPTION OF THE PREFERRED EMBODIMENT(S)

Figure 1A:
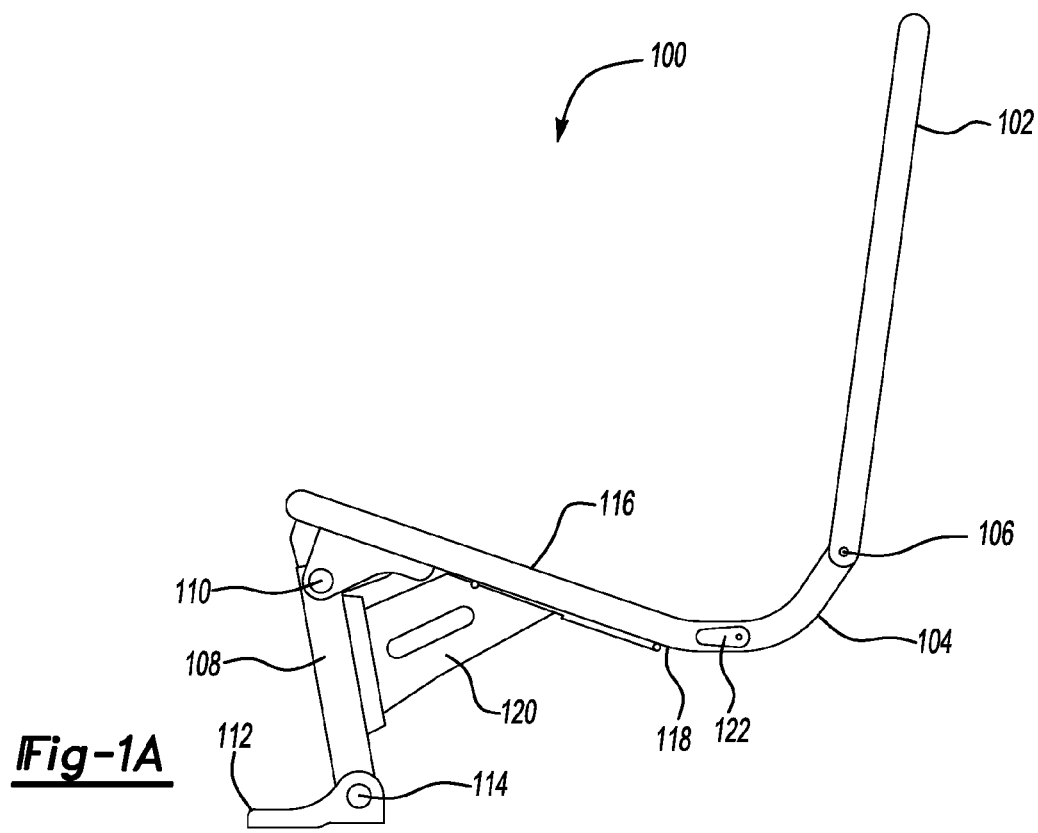
FIGS. 1A-1C illustrate different views of a vehicle seat assembly positioned in an upright seating position and a blocking member fully engaged with a leg in accordance to one embodiment of the present invention.
Figure 1B:
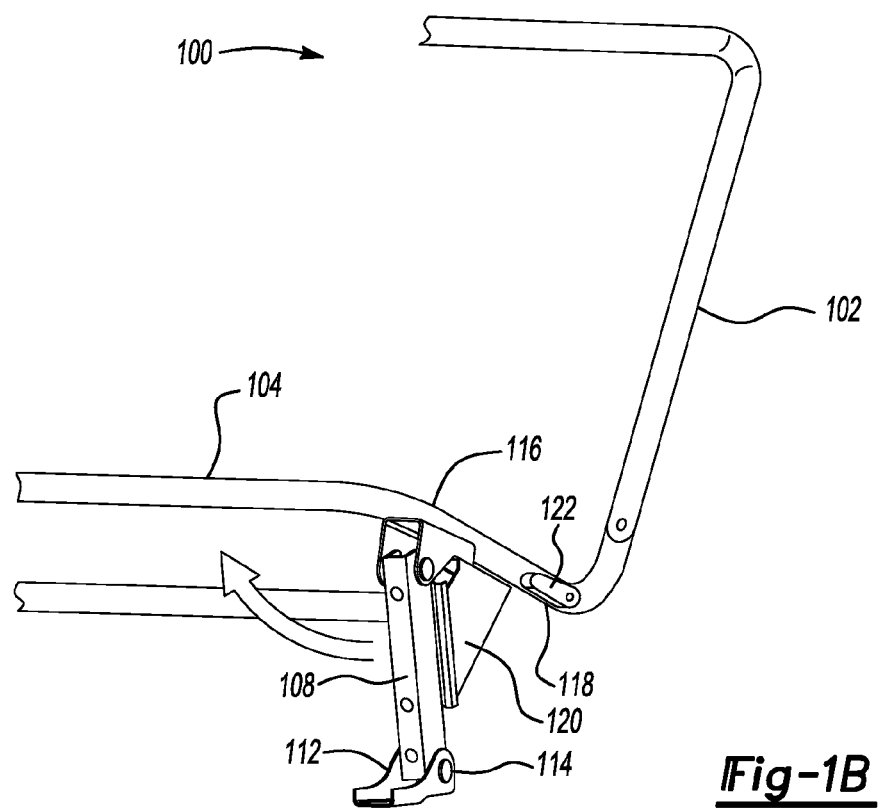
Figure 1C:
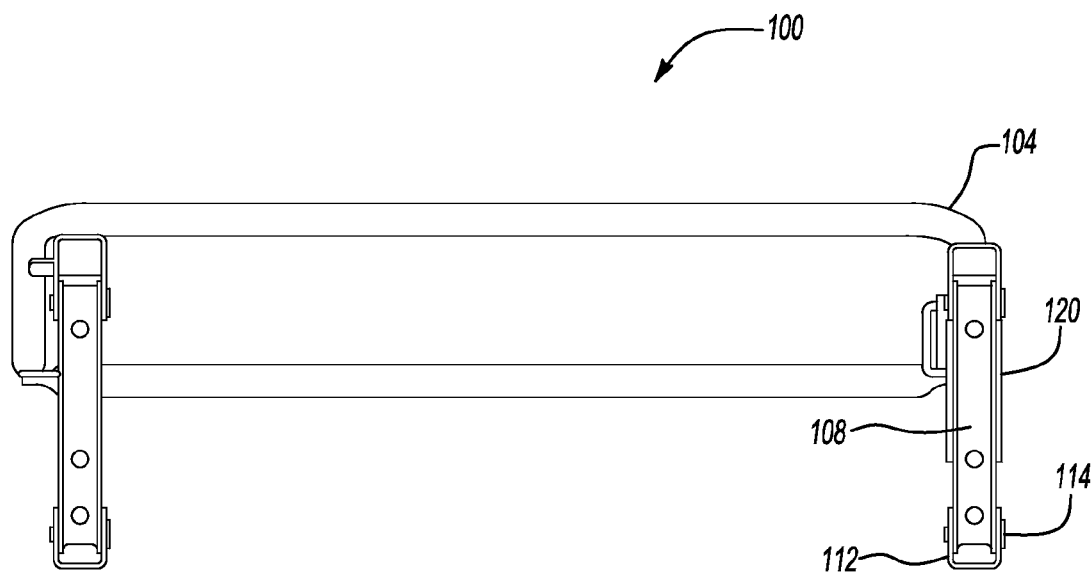

FIGS. 1A-1C illustrate different views of a vehicle seat assembly 100 positioned in an upright seating position in accordance to one embodiment of the present invention. The vehicle seat assembly 100 is configured to articulate from a folded position to a fully upright seating position. The vehicle seat assembly 100 is also configured to articulate from the fully upright seating position back to the folded position. The assembly 100 may be used in any vehicle seat that uses a fold-down feature. The assembly 100 may be used in connection with first, second and third row seat configurations of the vehicle.

FIG. 1A illustrates a side view of the vehicle seat assembly 100. The assembly 100 generally comprises a seat back frame 102 and a lower seat cushion frame 104. The seat back frame 102 and the seat cushion frame 104 generally support various cushions, pads, trim covers, retention features, shields, mechanisms and/or motors (not shown). The seat back frame 102 is adapted to pivot about a first pivot point 106 to allow the seat back frame 102 to rotate and fold over the seat cushion frame 104.

The seat cushion frame 104 comprises first and second sides 116, 118. The first side 116 of the seat cushion frame 104 generally faces an upward direction toward the top of the vehicle. The second side 118 of the seat cushion frame 104 comprises the remaining portion of the seat cushion frame, including the side portions and any portion that faces the floor of the vehicle. A leg 108 is pivotally coupled to the seat cushion frame 104. The leg 108 may be alternatively attached to the seat cushion frame 104 in a location or manner that differs from a bracketed coupling to the second side 118 of the side member of the seat cushion frame 104 depicted in FIGS. 1B, 3A and 3B. One or more additional legs may be positioned opposite the leg 108 (one example is shown in connection with FIGS. 1C, 2C and 3C), or at a variety of predetermined locations along the cross-car width of the vehicle seat 100 (not shown). The additional legs may be pivotally coupled to the seat cushion frame 104. If the seat cushion frame 104 is supported by a single leg 108, the leg may be positioned at a variety of locations (not shown) along the cross-car width of the vehicle seat 100 which may differ from that shown in FIGS. 1B, 2B and 3B.

The seat cushion frame 104 and the leg 108 pivot about a second pivot point 110 with respect to each other. The leg 108 is also pivotally coupled to a bracket 112. The bracket 112 is coupled to the floor of the vehicle. The bracket 112 includes a third pivot point 114 to allow the leg 108 to rotate in fore and aft directions in the vehicle for facilitating the positioning of the assembly 100 either in the folded position or in the upright seating position.

A blocking member 120 is generally pivotally coupled to the second side 118 of the seat cushion frame 104. While the assembly 100 is in the upright seating position as illustrated in FIG. 1A, the blocking member 120 is engaged with the leg 108 to stabilize the seat assembly 100. The blocking member 120 stabilizes the seat assembly 100 by limiting the reactionary rotation of the seat cushion frame 104 about the pivot point 110, with respect to the leg 108, in the event the vehicle experiences a collision.

In general, forces transferred by the seated occupant (or other such cargo in the vehicle) to the seat assembly 100 while in the upright position during a vehicle collision may cause the seat back frame 102, the seat cushion frame 104 and the legs 108 to pivot and rotate in a forward and downward direction thereby causing the seat 100 to fold upon itself and towards the floor. Without the addition of one or more blocking members 120 to the seat assembly 100, the motion of the seat assembly 100 as exhibited during vehicle collision might otherwise be similar to the motion of the seat assembly 100 as the seat moves from the upright seating position to the folded position when actuated by a user to obtain the benefit of the flexible seat functionality.

The blocking member 120 remains in the engaged position with the leg 108 when the seat is in the fully upright seating position. The blocking member 120 may prevent the seat cushion frame 104 from translating forward and pivoting downward about the second and third pivots 110, 114 with respect to the leg 108 to prevent the seat from collapsing in the event the vehicle experiences a collision. Stabilizing the seat cushion frame 104 additionally adds stability to the seat assembly 100 by limiting forward translation and reactionary rotation of the seat back frame 102. By stabilizing the seat cushion frame 104, the lower body portion of the occupant positioned on the seat cushion may be adequately supported, the relative motion of the occupant with respect to the vehicle interior and the forward angular rotation of the seat back 102 against the upper body portion of the occupant may be reduced, generally improving the overall kinematic response of the occupant in a collision.

The blocking member 120 is generally adapted to fold or rotate in and out of contact with the leg 108. The blocking member 120 may pivot out of contact with the leg 108 thereby allowing the leg 108 to pivot and the seat back frame 102 and the seat cushion frame 104 to move forward and downward in order to move the assembly 100 from the upright seating position to the folded position. Such a characteristic will be discussed in more detail in connection with FIGS. 2A-2C and FIGS. 3A-3C. The particular size, shape, mounting location and orientation of the blocking member 120 may be varied to achieve various surface engagement relationships or satisfy particular functional or load carrying requirements for a desired implementation. The seat assembly 100 may also be adapted to include additional blocking members 120 generally attached to the second side 118 of the seat cushion frame 104. Each additional blocking member 120 may be adapted to engage each leg disposed about the cross-car width of the seat assembly 100. The number of blocking members needed to engage the various legs disposed about the cross-car width of the seat assembly 100 may be varied based on the desired criteria of a particular implementation.

FIG. 1B illustrates a partial perspective view of the vehicle seat assembly 100. A seat position adjustment mechanism 122 may be coupled to the seat cushion frame 104. The seat position adjustment mechanism 122 is adapted to allow an occupant to collapse the assembly 100 such that the seat back frame 102 folds over the seat cushion frame 104 and the leg 108 pivots forward to allow the assembly 100 to move from the upright seating position to the folded position. In an opposite manner, the seat position adjustment mechanism 122 may allow the occupant to move the assembly 100 from the folded position to the upright seating position.

While FIGS. 1A-1C generally illustrate the seat position adjustment mechanism 122 as a lever/cable based mechanism with a user interface actuation feature located on the side of the seat assembly 100, the seat position adjustment mechanism 122 may be alternatively implemented. For example, the seat position adjustment mechanism 122 may articulate the seat assembly 100 by way of cable, rod, gear, spring release, inertia latch/de-latching or other system commonly implemented on a seat assembly, or by a combination of the same. The seat position adjustment mechanism 122 may be actuated manually, remotely, electronically or by a motor driven or automated device. The user may articulate the seat via an interface such as a handle, knob, electronic push button or other such related feature located on the seat back frame 102, the seat cushion frame 104, center console, door, and key fob or other vehicle-user interface.

The seat position adjustment mechanism 122 may be adapted to simultaneously move the blocking member 120 into engagement with the leg 108 as the assembly 100 moves from the folded position to the upright seating position. Such a configuration may eliminate the need for an occupant to independently actuate the seat position adjustment mechanism 122 while separately performing a secondary operation to activate and engage/disengage the blocking member 120. In such cases, the movement of the blocking member 120 into engagement with the leg 108 may likely be transparent to the occupant.

In order to simultaneously move the blocking member 120 into and out of engagement with the leg 108 as the seat assembly 100 is articulated through the range of folded and upright positions and back again, an interfacing linkage (not shown) may be adapted to react in response to the actuation of the seat position adjustment mechanism 122. The interfacing linkage may consist of a cable and spring assembly attached to both the seat position adjustment mechanism 122 and the blocking member 120 in such a manner as to draw the cable assembly into tension, in opposition to a spring force, upon the actuation of the seat position adjustment mechanism 122. The resultant extension of the cable assembly attached to the blocking member 120 may pull the blocking member 120 out of the path of the leg 108 as the seat assembly 100 folds down.

The stored spring force in the cable system enables the cable to translate back into a reduced tension state as the seat is articulated into the upright position, allowing the blocking member 120 to rotate back into blocking position in contact with the leg 108. The cable and spring assembly may instead, or additionally, be attached to a feature integral or otherwise attached to an alternative component of the seat assembly 100 (such as the seat cushion frame 104 or back frame 102) in order to increase the travel distance of the cable and the resultant stored spring tension by taking advantage of the mechanical advantage of the folding motion of the seat assembly 100 upon actuation of the seat adjustment mechanism 122. Alternatively, the blocking member 120 may be moved into and out of engagement with the leg 108 in response to the actuation of the seat position adjustment mechanism 122 by adapting any of a plurality of mechanical or electrical solutions including but not limited to manual gear systems, powered motors, inertial latching/de-latching and other mechanisms (not shown) disposed about the seat assembly 100 to drive the blocking member 120 in conjunction with the positioning of the seat back frame 102 and/or seat cushion frame 104.

The blocking member 120 may be configured to move inwardly or outwardly when the blocking member 120 moves to engage the leg 108. To move the blocking member 120 out of contact with the leg 108, the blocking member 120 may be configured to move in a direction that is opposite to the direction taken for the blocking member 120 to move into engagement with the leg 108. The blocking member 120 may generally be positioned on either an inboard portion of the seat cushion frame 104 or an outboard portion of the seat cushion frame 104. The blocking member 120 may also be configured to translate in fore or aft directions about the seat cushion frame 104, in lieu of, or in combination with pivotal motion (not shown) to allow the seat assembly 100 to fold up or down.

FIG. 1C illustrates a partial front view of the assembly 100. The blocking member 120 is positioned directly behind the leg 108 and vertically below the second side 118 of the outermost width of the seat cushion frame 104. The leg 108 may instead be located in a position other than beneath the side member of seat cushion frame 104 (not shown). While the blocking member 120 may be generally located directly behind the leg 108 as shown in FIGS. 1A and 1B, the blocking member 120 may alternatively be located adjacent to, inboard or outboard of, the leg 108. Similarly, the blocking member 120 and the leg 108 may share an engagement surface contact area located directly behind the leg 108, adjacent to the leg 108 or to a feature integral or attached to the leg 108 (not shown), or within a recessed surface (not shown) within the leg 108 (e.g., U-section in the leg 108).

Figure 2A:
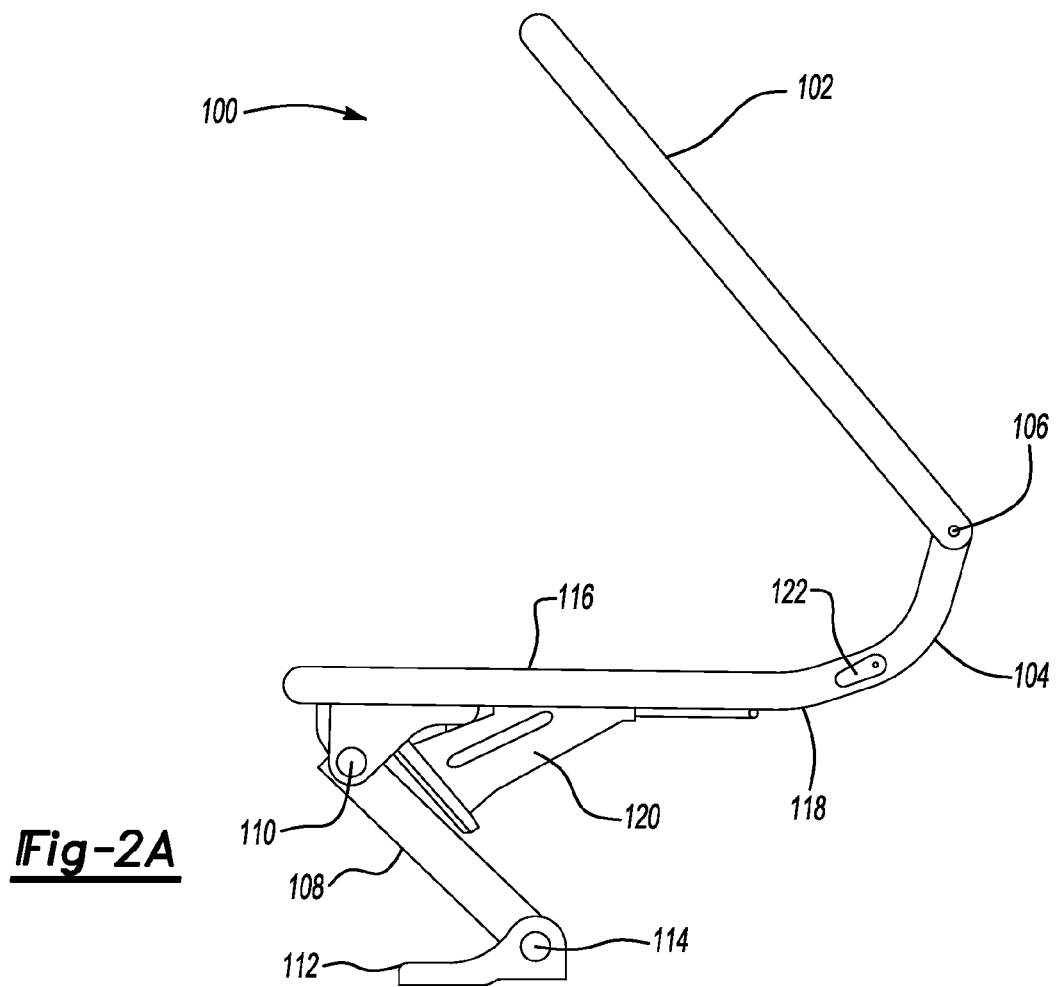
FIGS. 2A-2C illustrate different views of the vehicle seat assembly positioned in a semi-folded position and a blocking member disengaged from a leg while in a transition state between stowed and fully engaged positions.

FIG. 2A illustrates a side view of the vehicle seat assembly 100 positioned in a semi-folded position. The semi-folded position of the assembly 100 may represent any position of the assembly 100 that is between a fully folded position or a fully upright seating position. In the semi-folded position, the seat back frame 102 pivots forward and downward about the first pivot point 106 while the seat cushion frame 104 pivots about the second pivot point 110 in a generally downward and forward motion. The leg 110 also pivots in a generally downward and forward motion about the third pivot point 114 toward the floor of the vehicle.

Figure 2B:
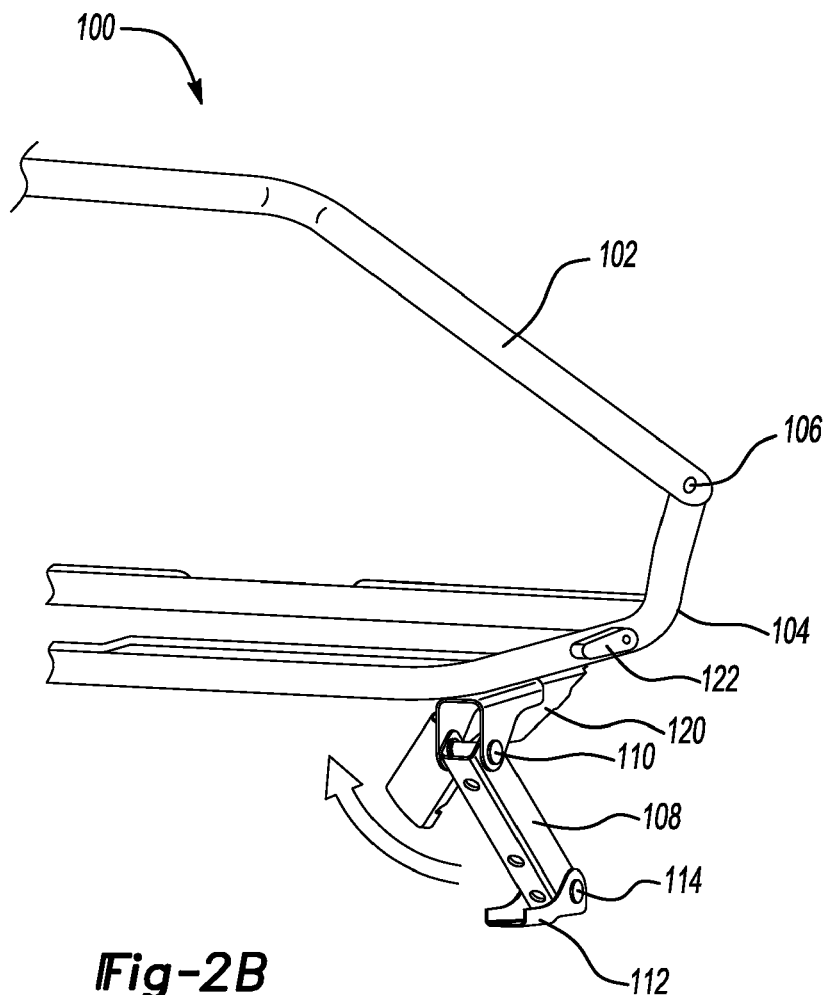

FIG. 2B illustrates a partial perspective view of the seat assembly 100 oriented in a semi-folded position. While in the semi-folded position, the blocking member 120 pivots in an inboard direction (with respect to the seat cushion frame 104) toward the second side 118 of the seat cushion frame 104 as the blocking member 120 disengages from contact with the leg 108. As noted in connection with FIGS. 1A-1C, the blocking member 120 may pivot in an outboard direction as the blocking member 120 disengages itself from contact with the leg 108.

Figure 2C:
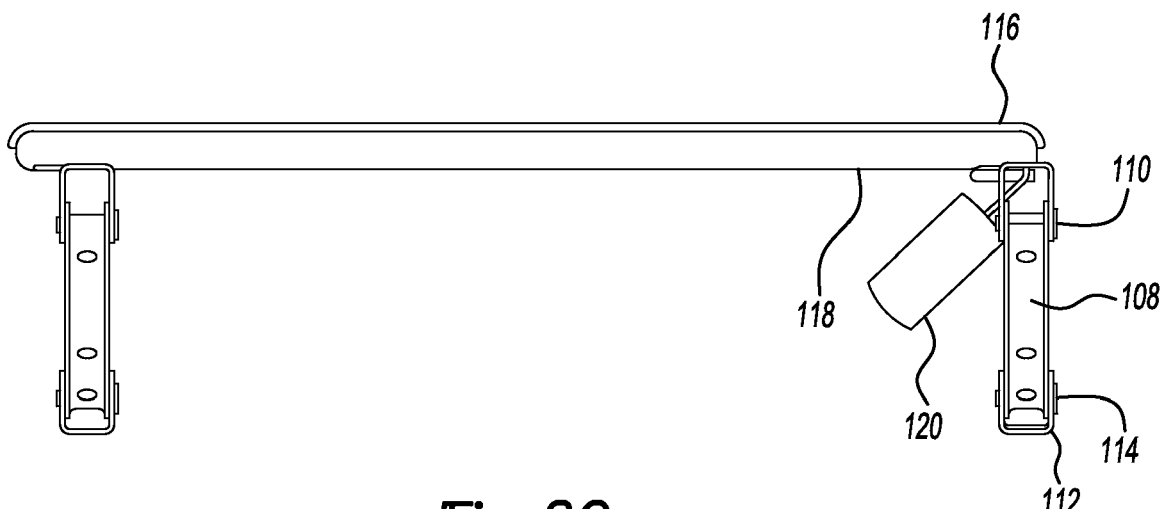

FIG. 2C illustrates a partial front view of the vehicle seat assembly 100 as the assembly 100 moves from the upright seating position to the folded position. FIG. 2C illustrates that the blocking member 120 generally allows the assembly 100 to translate forward and downward as the assembly 100 moves from the upright seating position to the folded position, by disengaging and pivoting away from the leg 108 to enable unhindered operation of the fold feature of the assembly 100.

Figure 3A:
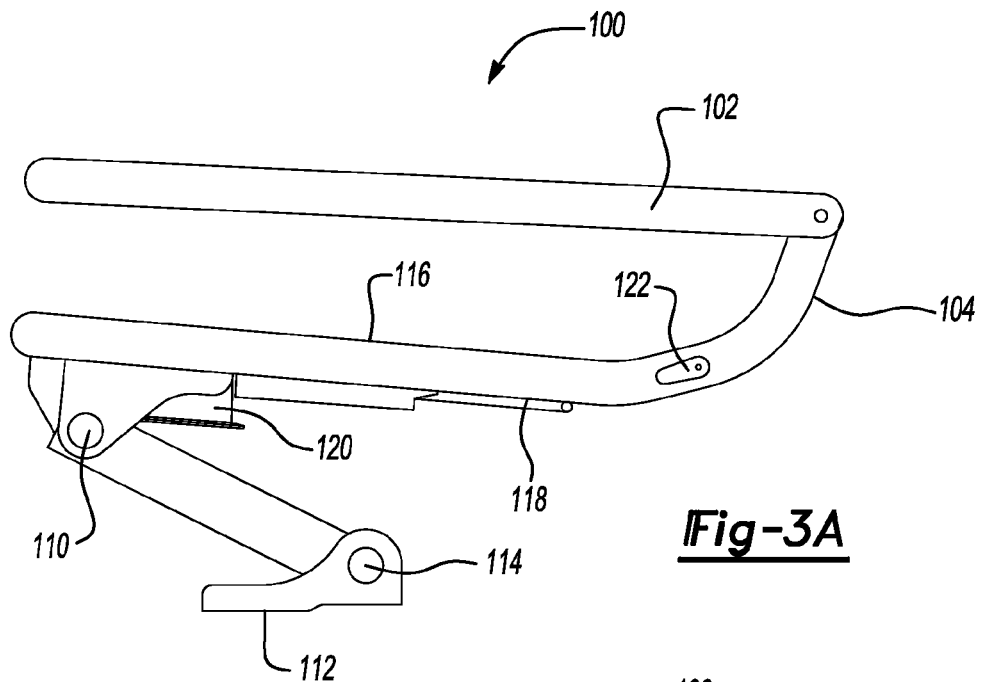
FIGS. 3A-3C illustrate different views of the vehicle seat assembly positioned in a folded position and a blocking member in a stowed position underneath the seat.

FIG. 3A illustrates a side view of the vehicle seat assembly 100 positioned in the folded position. In the folded position, the leg 108 is positioned in a pivotal forward and downward position and the seat cushion frame 104 is positioned lower in comparison to the position of the leg 108 and the seat cushion frame 104 as illustrated in FIGS. 1A-1C and 2A-2C. The seat back frame 102 may be parallel to the seat cushion frame 104, while the seat assembly 100 is positioned in the folded position.

Figure 3B:
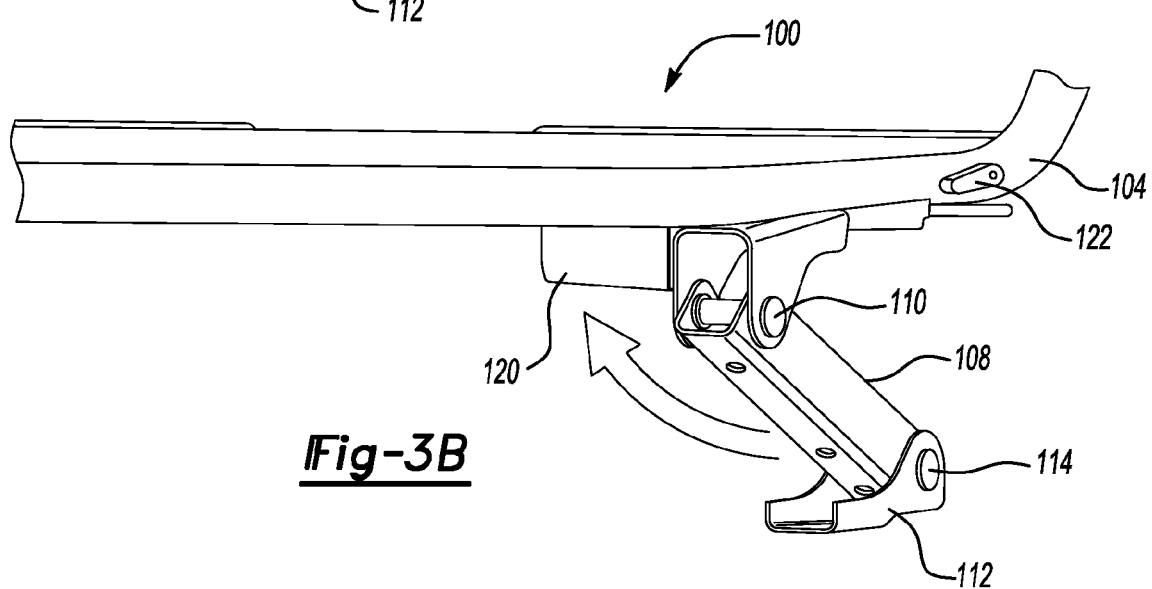

FIG. 3B illustrates a partial perspective view of the assembly 100 in the folded position. The blocking member 120 may be configured to abut the second side portion 118 of the seat cushion frame 104 when stowed. The blocking member 120 may also be configured to rest in a recessed area beneath the seat assembly 100, inboard of the structural side members of the seat cushion frame 104 on the seat assembly 100 when stowed, without contacting the second side 118 of the seat cushion frame 104. The blocking member 120, when stowed, is configured to occupy a minimum amount of packaging space when the assembly 100 is in the folded position.

Figure 3C:
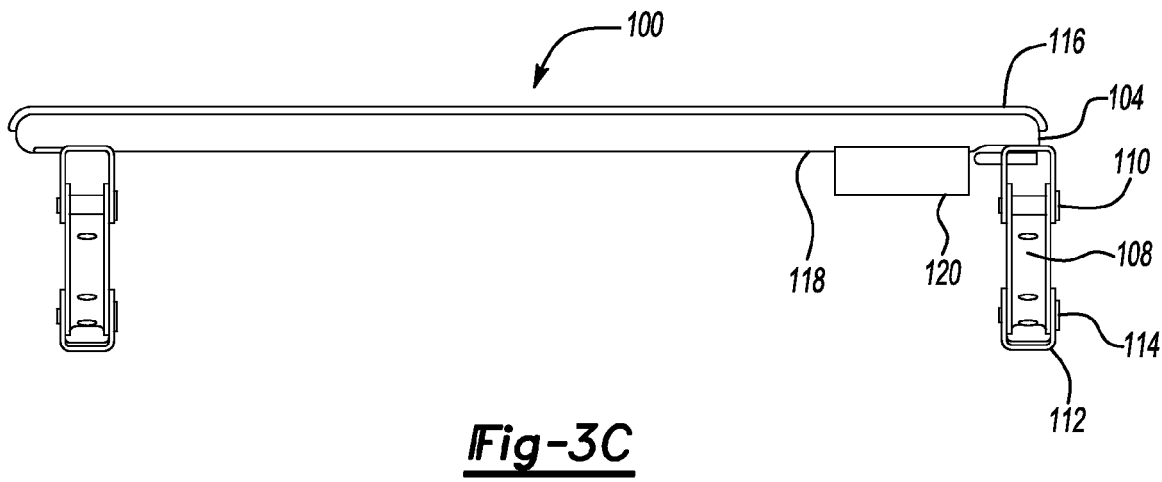

FIG. 3C illustrates a partial front view of the assembly 100 in the folded position. When stowed, the blocking member 120 is generally positioned to rest in an orientation approximately 90 degrees inwards from, or perpendicular to, the upright position of the blocking member 120 when engaged with the leg 108. While not illustrated in FIG. 3C, for a seat assembly 100 incorporating two legs, an additional blocking member may be coupled to the seat cushion frame 104 and function in a symmetrically opposite manner as the additional blocking member disengages from the leg 108 located on the other side of the seat in order to rest in a stowed position approximately 90 degrees inwards from, or perpendicular to, the upright position of the blocking member 120 when engaged with the leg 108. The vehicle seat assembly 100 may instead include only a single leg and blocking member or a plurality of legs and blocking members. In such instances, the direction of movement of a blocking member 120 as the blocking member 120 disengages from contact with a leg 108, and the subsequent final resting position of the blocking member 120 with respect to the seat cushion frame assembly 104, may differ from that depicted in FIG. 3C. When in the stowed position, a blocking member 120 may rest in an orientation other than perpendicular to the upright blocking position, dependant upon the peripheral package content and geometry of the vehicle interior beneath the seat and the seat assembly 100 when in the folded position.

FIGS. 4A-4C illustrate various examples of first and second engagement configurations for the blocking member 120 engaged with the seat leg 108 of the vehicle seat assembly 100. In reference to FIG. 4A, the blocking member 120 generally comprises a first engagement surface 123. The leg 108 generally comprises a second engagement surface 124. While the assembly 100 is in the upright seating position, the second engagement surface 124 is adapted to receive the first engagement surface 123 to positively align the blocking member 120 when engaged with the leg 108 to increase surface contact.

FIGS. 4A-4B illustrate isometric and sectional views of a first engagement surface 123 that may be shaped in the form of a first L-shaped surface 126. The second engagement surface 124 may be shaped in the form of a second L-shaped surface 128. The first L-shaped surface 126 may be inversely engaged with the second L-shaped surface 128 when the assembly 100 is in the upright seating position. The inverse engagement between the two surfaces of 126 and 128 enables the blocking member 120 to apply a force against the leg 108 and positively align the blocking member 120 to the leg 108. The positive alignment between the blocking member 120 and the leg 108 increases the surface contact engagement between the leg 108 and the blocking member 120 to stabilize the seat assembly 100 in the event the vehicle sustains a collision.

FIG. 4C illustrates a section view of an example of the first and second engagement surfaces 123 and 124 shaped in an alternative configuration. The blocking member 120 may have a local T-shaped cross-section proximate to the interface of the leg 108, where the first engagement surface 123 may be represented as a single extended linear plate-like contact surface 130 (or plate surface). The plate surface 130 may abut a portion of the leg 108, or a feature integral or otherwise attached to the leg 108, when the assembly 100 is in the upright seating position. The plate surface 130 on the blocking member 120 may also engage a U-shaped surface section or pocket on the leg 108 to increase surface contact and positive alignment of the blocking member 120 in relation to the leg 108 when in the upright position (not shown). The plate surface 130 contacts the leg 108 and allows the blocking member 120 to apply a blocking force against the leg 108 to stabilize the seat assembly 100 in the event the vehicle sustains a collision. Additional engagement relationships may include the blocking member 120 and the leg 108 having various surface contact/interlocking configurations, alignment features or snap fit implementations to ensure that the blocking member 120 and the leg 108 remain engaged with each other while the assembly 100 is in the upright seating position (not shown). The blocking member 120 and the leg 108 may be implemented with a variety of interfacing cross-sectional and geometric surface contact shape configurations to achieve various surface engagement relationships or satisfy particular functional or load carrying requirements for a desired implementation.

Figure 5:
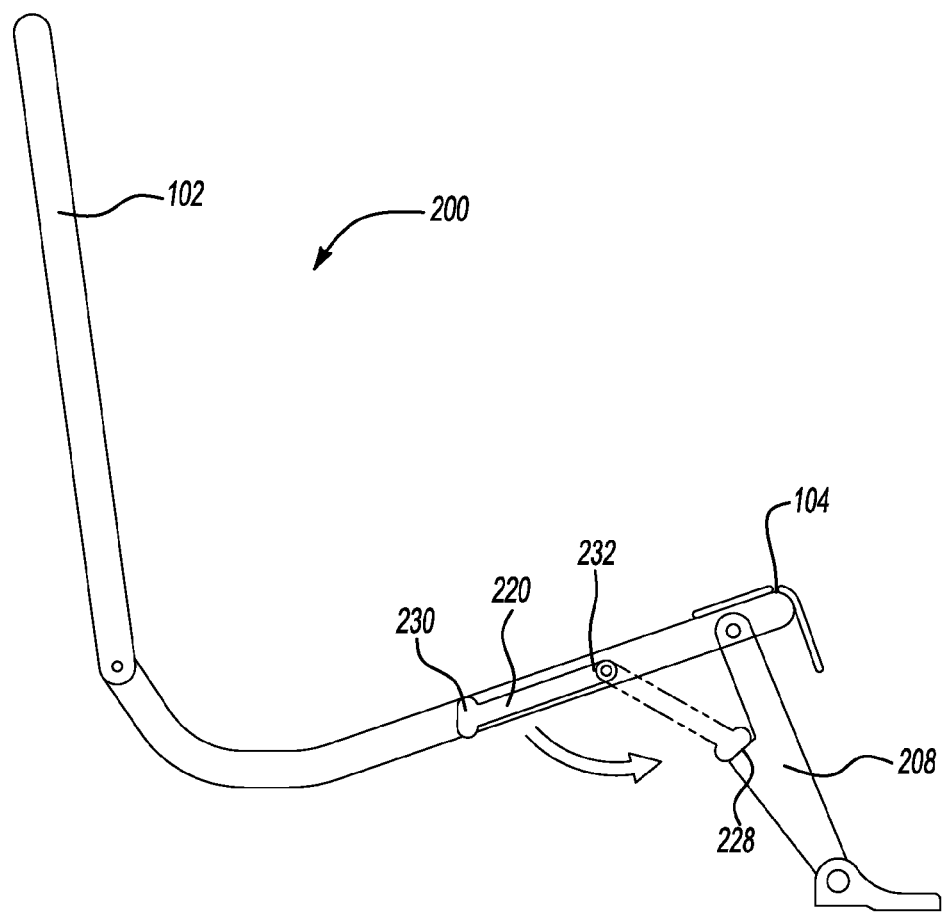
FIG. 5 illustrates a side view of a vehicle seat assembly in accordance to another embodiment of the present invention.

FIG. 5 illustrates a vehicle seat assembly 200 in accordance to one embodiment of the present invention. The assembly 200 generally comprises the seat back frame 102, the lower seat cushion frame 104, a leg 208 and a blocking member 220. The blocking member 220 is pivotally coupled to the seat cushion frame 104 and is adapted to remain in a stowed and generally parallel position with respect to the side member of the seat cushion frame 104 throughout the movement of the assembly 200 from the folded position through the upright seating position. In such a configuration, the blocking member 220 may be adapted to pivot toward the leg 208 in response to the vehicle experiencing a collision, or upon the seat assembly 100 experiencing an acceleration load that exceeds a predetermined limit. Additional blocking members (not shown) may be pivotally coupled to the seat cushion frame 104 and pivot toward additional legs (not shown) positioned about the seat assembly 200.

The blocking member 220 may be inertia based in that the blocking member 220 remains in a stationary position and moves toward the leg 208 in response to vehicle experiencing an external force. To facilitate the inertia based characteristic of the blocking member 220, the blocking member 220 comprises a weighted section 230 and a pivot section 232. The pivot section 232 is located opposite to the weighted section 230. The weighted section 230 may be larger in size than the rest of the blocking member 220 to create a weight differential between the weighted section 230 and the rest of the blocking member 220. While FIG. 5 generally illustrates that the seat assembly 200 provides for various coupled members (e.g., seat back frame 102, seat back cushion frame 104, and the leg 208), the seat assembly 200 may be implemented in a variety of configurations not shown in FIG. 5. The vehicle seat 200 may incorporate a variety of combinations of rigid, detachable and/or pivotal seat cushion frame 104 to seat back frame 102 coupling configurations in combination with a variety of rigid, detachable and/or pivotal couplings both between the seat cushion frame 104 and one or more legs 208 and/or between one or more legs 208 and the vehicle floor.

As the vehicle experiences a collision and/or the seat assembly 100 experiences an acceleration load exceeding the predetermined limit, the weighted section 230 of the blocking member 220 pivots toward the leg 208 and engages the leg 208. An engagement surface 228 of the leg 208 may receive the weighted section 230 and retain the blocking member 220 so that the blocking member 220 remains engaged with the leg 208 for the duration of the event.

In one example, to accelerate the movement of the weighted section 230 of the blocking member 220 toward the leg 208, a spring (not shown) may be coupled to the blocking member 220 to increase the speed at which the blocking member 220 is projected toward the leg 208 to stabilize the assembly 200 in the event the vehicle experiences a collision. For example, the spring may be held in a pre-loaded state against the blocking member 220, storing energy. In such a configuration, as a collision takes place or the acceleration load limit is exceeded, the energy stored in the spring may be released, thereby allowing the blocking member 220 to move toward the leg 208 at an increased velocity. The addition of the spring may reduce any delay in delivering the blocking member 220 into engagement with the leg 208. Energy may be stored by incorporating any of a number of spring implementations, such as a compression or tension spring that may be linear in nature and disposed proximate to the weighted section 230. The spring force could be stored by maintaining the spring in a pre-loaded compressed or tension state. In another example, the spring may be coil shaped and positioned about the pivot section 232 with the spring force energy stored by maintaining the coil in a partially wound or unwound state while in the stowed position.

The blocking member 220 may also include additional engagement features (not shown) to allow the blocking member 220 to remain engaged with the leg 208. The engagement surface 228 on the leg 208 that is adapted to receive and retain blocking member 220 may include various interlocking configurations, alignment features or snap fit implementations to ensure that the blocking member 220 and the leg 208 remain engaged with each other. Examples may include one or more magnets (not shown) that are coupled or integrated with the leg 208 and the blocking member 220 to magnetically hold the blocking member 220 in engagement with the leg 208. The engagement surface 228 and/or blocking member 220 may also incorporate spring clips, broomstick handle-style (spring steel) holders to retain a rod-like support member, finger/window engagement features to positively engage the blocking member 220 to the leg 208. The overall length, cross-sectional shape, mounting location and orientation of the blocking member 220 and the geometric shape and location of the interfacing engagement surface 228 on the leg 208 may be varied to satisfy particular functional or load carrying requirements for a desired implementation.

The blocking member 220 may also be located adjacent to, and inboard or outboard of, the leg 208. Similarly, the blocking member 220 and the leg 208 may share an engagement surface contact area located directly behind the leg 208, adjacent to the leg 208 or to a feature integral or attached to the leg 208 (not shown), or within a recessed surface (not shown) within the leg 208 (e.g., U-section in the leg 208). Additionally, the blocking member 220 may be attached to a bracket (not shown) mounted to the seat cushion frame 104 if not attached directly to the cushion frame 104.

Figure 6:
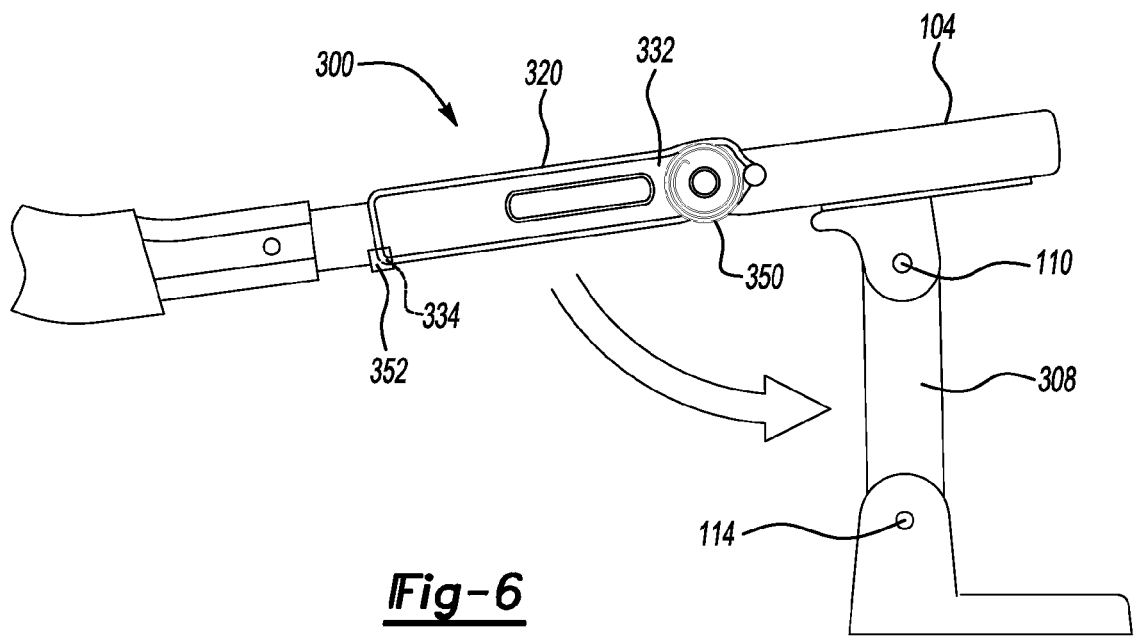
FIG. 6 illustrates a partial side view of a vehicle seat assembly in accordance to another embodiment of the present invention.
Figure 7:
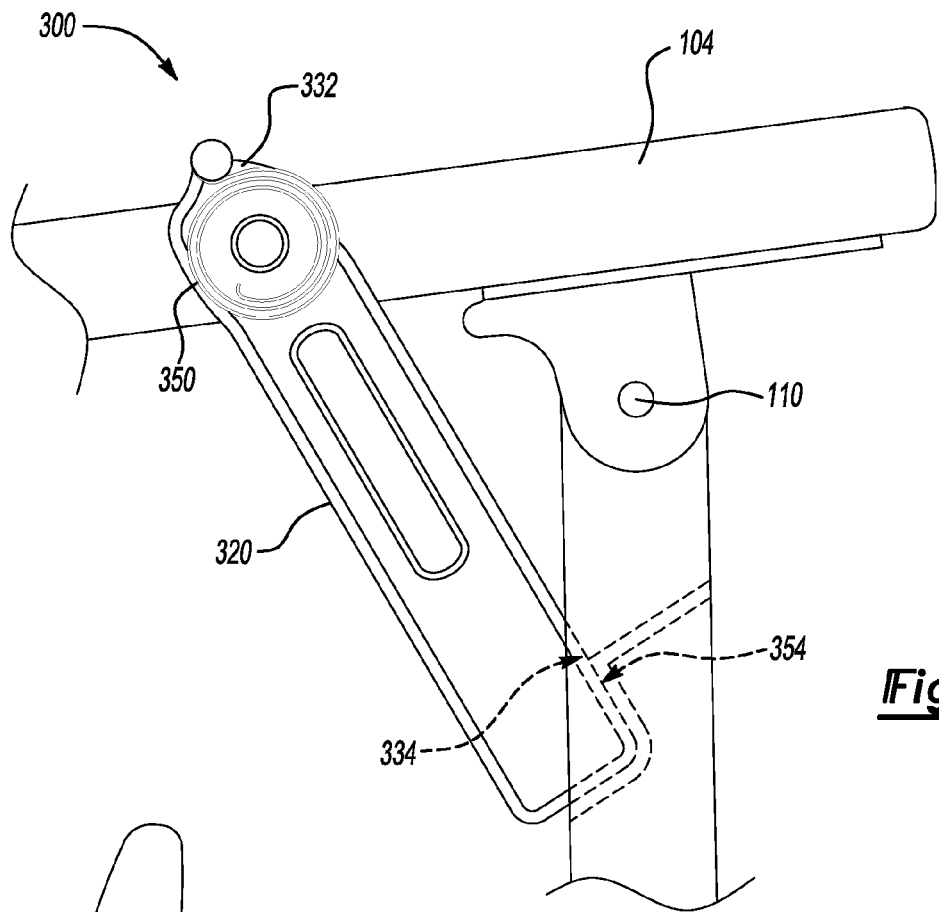
FIG. 7 illustrates another partial side view of the vehicle seat assembly of FIG. 6.

FIGS. 6-7 illustrate a vehicle seat assembly 300 in accordance with another embodiment of the present invention. The assembly 300 generally comprises the seat back frame 102 (not shown), the lower seat cushion frame 104, a leg 308 and a blocking member 320. In various examples, the blocking member 320 may shaped or formed into a bar, rod, beam, plate or other extended load bearing shape. The blocking member 320 is pivotally coupled to the seat cushion frame 104 and is adapted to remain in a pre-loaded and generally parallel position with respect to the side member of the seat cushion frame 104 as the assembly 300 moves from the folded position to the upright seating position. In such a configuration, the blocking member 320 is adapted to pivot toward the leg 308 in response to the vehicle experiencing an impact or the seat assembly 100 experiencing an acceleration load exceeding a predetermined limit. Additional blocking members (not shown) may be implemented in the seat assembly 300 and pivot towards additional legs (not shown) in the seat assembly 300 in response to the vehicle experiencing an impact. The blocking member 320 may be inertia based in that the blocking member 320 remains in a stowed and stationary position moving towards the leg 308 in response to the vehicle experiencing an external collision force or the seat assembly 100 exceeding a predetermined acceleration load limitation.

The blocking member 320 includes a pivot section 332 and a first engagement surface 334. The leg 308 comprises a second engagement surface 354 that is adapted to receive the first engagement surface 334 of the blocking member 320. A partially wound coil (or unwound) spring 350 may be loaded against the pivot section 332 of the blocking member 320, maintaining a reserve of stored energy in a pre-loaded condition. The first engagement surface 334, or an engagement feature in proximity to surface 334 (not shown), on the blocking member 320 may be coupled to a restraining member 352 that is integral or otherwise attached to the seat cushion frame 104. The restraining member 352 maintains the blocking member 320 in a pre-loaded and generally parallel stowed position with respect to the side member of the seat cushion frame 104. The restraining member 352 may comprise a small retaining clip, shear pin or similar retaining feature having a specific stiffness or shear strength that deforms, releases or shears under a predetermined acceleration load, as applicable. Such a deformation, shearing or similar releasing action enables the initiation of movement of the blocking member 320 from the stowed position to a position of contact engagement with the leg 308. The blocking member 320 may comprise a clip-like or similar feature extending from, or otherwise attached to the blocking member 320 or a detent, hole, or similar pocket-like feature integral to the blocking member 320 to interface with a retaining feature on the restraining member 352 of seat cushion frame 104. In a similar manner, there may be an inverse relationship between the blocking member 320 and the seat frame 104 such that the restraining member is instead integral or attached to the blocking member 320 and the retaining engagement surface is integral or otherwise attached to the seat cushion frame 104. As a collision takes place, the seat experiences an acceleration load exceeding a predetermined limit, the first engagement surface 334 is pivotally projected toward the leg 308 in response to the restraining member 352 releasing the blocking member 320, simultaneously releasing the stored energy from the coil spring 350. The released energy in the coil spring 350 increases the speed at which the blocking member 320 is delivered to engage the leg 308.

In the event a vehicle impact is avoided or the severity of the impact does not affect the structural integrity and functionality of the seat assembly 300, the blocking member 320 and leg 308 may be configured to enable disengagement of the blocking member 320 from the leg 308 in order to fold the seat down. The interfacing retention features that enable positive engagement between the blocking member 320 and leg 308 may be configured such that the actuation of the seat adjustment feature (previously identified as item 122) disengages the retention features as the seat assembly 300 is articulated into a folded position. Alternatively, the engagement retention features could be configured such that the seat assembly 300 may not be folded down until the user manually disengages the retention features to allow the blocking member 320 to disengage the leg 308 in order to articulate the seat assembly 300 into the folded position. The folding action of the seat assembly 100 may then be configured such that blocking member 320 re-seats itself in a stowed and restrained position, re-engaging the restraining member 352.

It should be noted that a blocking member 320 may additionally be located adjacent to, inboard or outboard of, the leg 308. Similarly, the blocking member 320 and the leg 308 may share an engagement surface contact area located directly behind the leg 308, adjacent to the leg 308 or to a feature integral or attached to the leg 308 (not shown), or within a recessed surface (not shown) within the leg 308. The blocking member 320 or restraining member 352 may be attached to a bracket mounted to the seat cushion frame 104 if not attached directly to the seat cushion frame 104. As previously stated in reference to earlier figures, the particular size, shape, location, orientation and related geometries of the blocking member 320, the leg 308 and contact surfaces 334 and 354 may be varied to achieve variety of surface contact engagement relationships or to satisfy particular functional or load carrying requirements for a desired implementation. Similarly, a variety of engagement retention features described in relation to FIG. 5 may be implemented to maintain positive engagement between the blocking member 320 and the leg 308 after initial engagement is achieved.

Figure 8:
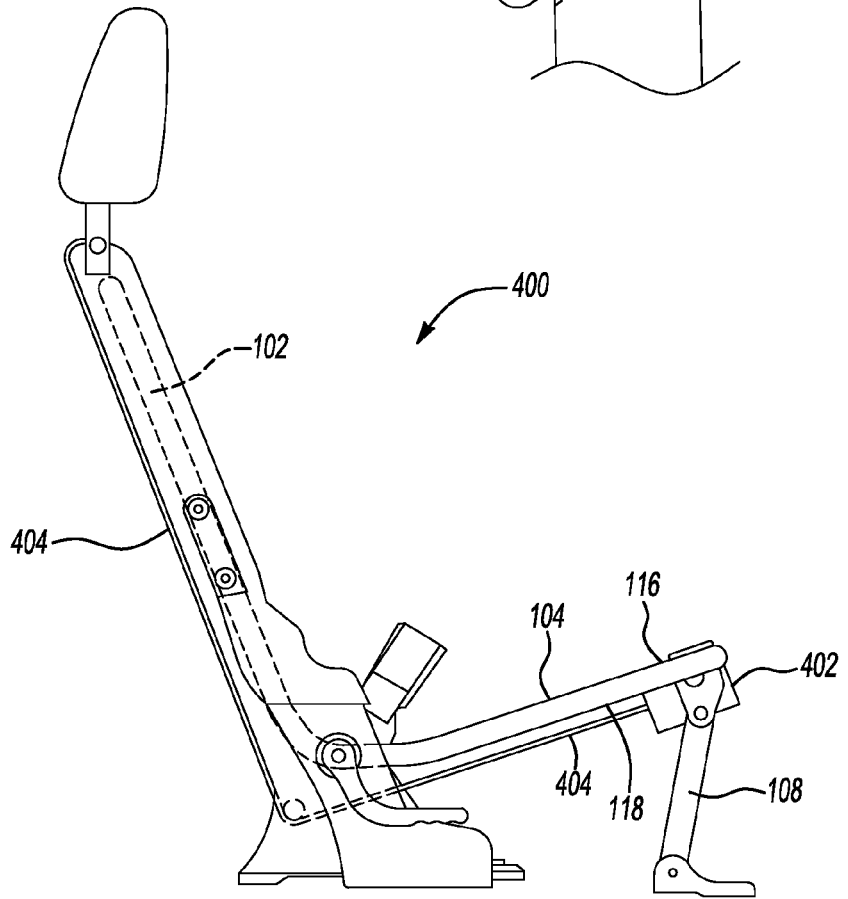
FIG. 8 illustrates a vehicle seat assembly in accordance to another embodiment of the present invention.

FIG. 8 illustrates a vehicle seat assembly 400 in accordance to another embodiment of the present invention. The assembly 400 generally comprises the seat back frame 102, the lower seat cushion frame 104, the leg 108 and a seat belt retractor 402. The seat belt retractor 402 is positioned on the second side 118 of the seat cushion frame 104 and may be proximate to the leg 108, dependant on the seat and restraint system geometry. The seat belt retractor 402 includes a retractor sensor mechanism (not shown) and webbing 404 which is used to restrain an occupant. The webbing 404 generally extends in a fore/aft direction with respect to the length of the vehicle and in a substantially parallel manner to at least a portion of the seat cushion frame 104 and in a substantially parallel manner along at least a portion of the back side of the seat back frame 102.

The seat belt retractor 402 may be adapted to the vehicle seat assemblies as described in connection with seat assemblies detailed in FIGS. 1A-1C, 2A-2C, 3A-3C, 5 and 6. With the various vehicle seat assemblies, the seat belt retractor 402 may be positioned on, or adjacent to, a leg in seat system design configurations having adequate package space available to allow for uninhibited articulation of any proximate blocking member throughout the blocking member's functional range of motion. Additionally, the seatbelt retractor 402 may be positioned beneath the vehicle seat but be affixed directly to an integral feature of the seat cushion frame 104, or to a bracket (not shown) attached to the seat cushion frame 104, in a position other than the front-most location of the second side portion 118 of the seat cushion frame 104

In the course of the vehicle experiencing a collision, the retractor sensor mechanism may lock the retractor 402 thereby preventing webbing payout. The forward motion of the seat back frame 102 caused by the forward motion of a belted occupant (not shown) during a frontal collision combined with the retractor 402 being in a locked state, may cause the webbing 404 to act as a tension member. Given the geometry of the seat back frame 102 and the webbing 404, the tension of the webbing 404 may create a rearward moment, which, in turn, may restrict any additional forward rotation of the seat back frame 102. Additional embodiments may include brackets or design specific geometric shapes being disposed at a lower portion of the seat back frame 104 (not shown) to further increase such a rearward moment of the webbing against the seat back frame 102. The assembly 400 may be incorporated with a seat configuration that utilizes a fold feature by allowing for an optional amount of webbing payout when the seat back frame 102 is released and pivoted forward during the folding operation.

The vehicle seats as depicted and described in relation to seat assemblies 100, 200, 300 and 400 may incorporate a variety of combinations of rigid, detachable and/or pivotal seat cushion frame to seat back frame coupling configurations in combination with a variety of rigid, detachable and/or pivotal couplings both between the seat cushion frame and one or more legs and/or between one or more legs and the vehicle floor.

Any reference to the vehicle seat assembly as depicted and described herein is generally applicable to passenger and/or commercial vehicles as well as to any apparatus used in connection with commercial transportation. For example, the vehicle seat assemblies as depicted and described herein may also be implemented with seats used in planes, trains, buses, or any other transportation mechanism that may be subject to any form of a collision while such a mechanism is operated by an operator/driver.

While the best mode for carrying out the invention has been described in detail, those familiar with the art to which this invention relates will recognize various alternative designs and embodiments for practicing the invention as defined by the following claims.

What is claimed:

1. A vehicle seat assembly coupled to a floor of a vehicle and adapted to move from a folded position to an upright seating position, the assembly comprising:
    a seat back frame;
    a seat cushion frame including a front section and a rear section, the seat cushion frame being pivotally coupled to the seat back frame;
    at least one leg being directly and pivotally coupled to the front section of the seat cushion frame and being pivotally coupled to the floor of the vehicle; and
    at least one blocking member coupled to the seat cushion frame for moving into engagement with the leg as the assembly moves from the folded position to the upright seating position, the blocking member is adapted to block movement of the leg and to stabilize the seat assembly in the event of a vehicle collision wherein the blocking member is pivotally coupled to the seat cushion frame and is adapted to move in one of an inward direction and an outward direction to engage the leg as the assembly moves from the folded position to the upright seating position.

2. The vehicle seat assembly of claim 1 wherein the blocking member is adapted to move in a direction opposite to the one of the inward direction and the outward direction to disengage from the leg as the assembly moves from the upright seating position to the folded position.

3. The vehicle seat assembly of claim 1 wherein the blocking member comprises a first engagement surface and the leg comprises a second engagement surface for receiving the first engagement surface so that the blocking member remains engaged with the leg while the seat is in the upright seating position.

4. The vehicle seat assembly of claim 3 wherein the first engagement surface comprises a first L-shaped surface and the second engagement surface comprises a second L-shaped surface, wherein the first L-shaped surface is adapted to inversely engage the second L-shaped surface so that the blocking member remains engaged with the leg while the seat is in the upright seating position.

5. The vehicle seat assembly of claim 3 wherein the first engagement surface comprises a plate surface adapted to abut the second engagement surface of the leg so that the blocking member remains engaged with the leg.

6. The vehicle seat assembly of claim 1 further comprising a seat position adjustment mechanism coupled to the blocking member and adapted to move the blocking member into engagement with the leg as the assembly moves from the folded position to the upright seating position and to move the blocking member out of engagement with the leg as the assembly moves from the upright seating position to the folded position.

7. The vehicle seat assembly of claim 1 further comprising a seat belt retractor having a seat belt webbing disposed on an underside of the seat cushion frame proximate to the leg, the webbing is adapted to extend in a substantially parallel manner along at least a portion of the seat cushion frame and in a substantially parallel manner along at least a portion of the seat back frame.

8. The vehicle seat assembly of claim 1 wherein the blocking member is stowed below the seat cushion frame when the assembly is in the folded position.

9. A vehicle seat assembly coupled to a floor of a vehicle, the assembly comprising:
    a seat back frame;
    a seat cushion frame including a front section and a rear section, the seat cushion frame being coupled to the seat back frame;
    at least one leg being directly coupled to the front section of the seat cushion frame and being coupled to the floor of the vehicle; and
    at least one blocking member coupled to the seat cushion frame for moving into engagement with the leg in response to the vehicle experiencing an impact, the blocking member is adapted to block movement of the leg and stabilize the seat assembly in the event of vehicle impact.

10. The vehicle seat assembly of claim 9 wherein the blocking member is pivotally coupled to the seat cushion frame and is adapted to pivot toward the leg in response to the vehicle experiencing an impact.

11. The vehicle seat assembly of claim 9 wherein the blocking member includes a first engagement surface and the leg includes a second engagement surface, the first engagement surface is adapted to engage the second engagement surface and hold the blocking member in engagement with the leg in response to the vehicle experiencing the impact.

12. The vehicle seat assembly of claim 9, wherein the blocking member includes a pivot portion and a weighted section, the pivot portion is pivotally coupled to the seat cushion frame and the weighted section is adapted to pivot toward the leg in response to the vehicle experiencing the impact.

13. The vehicle seat assembly of claim 9 further comprising a restraining member integral or coupled to the seat cushion frame and engaged against the blocking member and a spring disposed about the seat cushion frame and coupled to the blocking member, the restraining member is adapted to keep the blocking member in a pre-loaded state while retained against the seat cushion frame and the spring is adapted to apply a spring force against the blocking member.

14. The vehicle seat assembly of claim 13 wherein the restraining member is adapted to release the blocking member from a retained position about the seat cushion frame in response to the vehicle experiencing impact and the spring is adapted to increase the speed at which the blocking member is moved toward the leg.

15. The vehicle seat assembly of claim 9 further comprising a seat belt retractor having a seat belt webbing disposed on an underside of the seat cushion frame and proximate to the leg and the webbing extends in a substantially parallel manner along at least a portion of the seat cushion frame and in a substantially parallel manner along at least a portion of the seat back frame.

16. A vehicle seat assembly coupled to a floor of a vehicle and adapted to move from a folded position to an upright seating position, the assembly comprising:

a seat back frame;

a seat cushion frame pivotally coupled to the seat back frame;

at least one leg pivotally coupled to the seat cushion frame and further coupled to the floor of the vehicle and;

at least one blocking member coupled to a first side of the seat cushion frame which faces the floor of the vehicle for moving into engagement with the leg as the assembly moves from the folded position to the upright seating position, the blocking member is adapted to block movement of the leg and to stabilize the seat assembly in the event of a vehicle collision; wherein the blocking member is adapted to move in one of an inward direction and an outward direction to disengage from the leg as the assembly moves from the upright seating position to the folded position.

17. The vehicle seat assembly of claim 16 the blocking member is pivotally coupled to the first side of the seat cushion frame and comprises a first engagement surface, the leg comprises a second engagement surface for receiving the first engagement surface so that the blocking member remains engaged with the leg while the seat is in the upright seating position.

18. The vehicle seat assembly of claim 16 further comprising a seat position adjustment mechanism coupled to the blocking member and adapted to move the blocking member into engagement with the leg as the assembly moves from the folded position to the upright seating position and adapted to move the blocking member out of engagement with the leg as the assembly moves from the upright seating position to the folded position.

19. The vehicle seat assembly of claim 16 further comprising a seat belt retractor having a seat belt webbing disposed on the first side of the seat cushion frame and proximate to the leg, the webbing is adapted to extend in a fore/aft direction along the length of the vehicle and in a substantially parallel manner along at least a portion of the seat cushion frame and in a substantially parallel manner along at least a portion of the seat back frame, the retractor being adapted when in a locked state to function as a tension member for creating a rearward moment that restricts the forward rotation of the seat back frame.

20. The vehicle seat assembly of claim 16 wherein the seat cushion frame includes a front section and a rear section and the at least one leg is pivotally coupled to the front section of the seat cushion frame.

* * * * *